United States Patent
Bolind et al.

(10) Patent No.: US 7,556,791 B2
(45) Date of Patent: Jul. 7, 2009

(54) GYPSUM ANHYDRITE FILLERS AND PROCESS FOR MAKING SAME

(75) Inventors: Michael Lawrence Bolind, Ingleside, IL (US); Michael J. Porter, Akron, IN (US); Christopher Robert Nelsen, Lindenhurst, IL (US)

(73) Assignee: United States Gypsum Company, Chicago, IL (US)

( * ) Notice: Subject to any disclaimer, the term of this patent is extended or adjusted under 35 U.S.C. 154(b) by 170 days.

(21) Appl. No.: 11/613,417

(22) Filed: Dec. 20, 2006

(65) Prior Publication Data

US 2008/0152559 A1 Jun. 26, 2008

(51) Int. Cl.
C01F 11/46 (2006.01)
(52) U.S. Cl. ..................................... 423/555
(58) Field of Classification Search ............... 423/555
See application file for complete search history.

(56) References Cited

U.S. PATENT DOCUMENTS

| | | | |
|---|---|---|---|
| 1,931,240 A | 10/1933 | Randel et al. | |
| 1,941,188 A | 12/1933 | Randel | |
| 2,177,254 A | 10/1939 | Heckert | |
| 2,418,590 A | 4/1947 | Linzell et al. | |
| 3,236,509 A | 2/1966 | Blair | |
| 3,650,689 A * | 3/1972 | Cafferata | 423/555 |
| 3,822,340 A | 7/1974 | Eberl et al. | |
| 3,835,219 A * | 9/1974 | Jaunarajs et al. | 423/555 |
| 3,956,456 A * | 5/1976 | Keller et al. | 423/171 |
| 4,029,512 A | 6/1977 | Jaunarajs et al. | |
| 4,086,099 A | 4/1978 | Prudhon et al. | |
| 4,151,000 A * | 4/1979 | Bachelard et al. | 106/611 |
| 4,152,408 A | 5/1979 | Winslow | |
| 4,387,083 A * | 6/1983 | Weterings et al. | 423/555 |
| 4,626,199 A | 12/1986 | Bounini | |
| 4,629,419 A | 12/1986 | Ward et al. | |
| 4,744,961 A | 5/1988 | Bounini | |
| 5,169,444 A | 12/1992 | Boos et al. | |
| 5,169,617 A | 12/1992 | Clemens et al. | |
| 5,954,497 A | 9/1999 | Cloud et al. | |
| 6,054,101 A | 4/2000 | Langfeldt et al. | |
| 6,174,362 B1 | 1/2001 | Dussel | |
| 6,641,658 B1 | 11/2003 | Dubey | |
| 6,706,113 B1 | 3/2004 | Couturier | |

* cited by examiner

Primary Examiner—Timothy C Vanoy
(74) Attorney, Agent, or Firm—Novak Druce + Quigg LLP

(57) ABSTRACT

A process is disclosed for making dead burn calcium sulfate anhydrite. The process includes a slurry calcination step to produce calcium sulfate anhydrite followed by removing free water from the anhydrite while avoiding substantial rehydration. Also disclosed are dead burn calcium sulfate anhydrite particles with high aspect ratios, e.g. fibers having an average aspect ratio of at least 4:1, or very fine particle size, e.g., at or below 2 micrometers average, combined with very low water content, e.g., less than 0.5, preferably less than 0.3, wt. % water. These particles are typically useful as fillers.

16 Claims, 13 Drawing Sheets

GYPSUM ANHYDRITE FILLERS AND PROCESS FOR MAKING SAME

FIELD OF THE INVENTION

This invention relates to an improved method of making anhydrite or anhydrous gypsum (calcium sulfate) which is often referred to, in insoluble form, as "dead burn". In particular, anhydrous calcium sulfate fillers are produced in water slurry under high temperature and high pressure conditions. Any dead burn filler can be produced by this process. The process can also produce anhydrous fillers with high aspect ratios, e.g. fibers, or very fine particle size, e.g., below 2 micrometers average, combined with very low water content, e.g., less than 0.3 wt. %.

BACKGROUND OF THE INVENTION

Generally, gypsum-containing products are prepared by forming a mixture of calcined gypsum (i.e., calcium sulfate hemihydrate and/or calcium sulfate anhydrite) and water, and, optionally, other components, as desired. The mixture typically is cast into a pre-determined shape or onto the surface of a substrate. The calcined gypsum reacts with the water to form a matrix of crystalline hydrated gypsum, i.e., calcium sulfate dihydrate. It is the desired hydration of calcined gypsum that enables the formation of an interlocking matrix of set gypsum, thereby imparting strength to the gypsum structure in the gypsum-containing product.

Calcium sulfate is available in several forms as follows: Dihydrate—$CaSO_4.2H_2O$ (commonly known as gypsum); Hemihydrate—$CaSO_4.1/2H_2O$ (commonly known as stucco); and Anhydrite—$CaSO_4$.

When gypsum, (i.e., calcium sulfate dihydrate) is calcined, water is removed from the structure of the calcium sulfate molecule. When one and a half molecules of water are removed from the molecular structure of gypsum, the hemihydrate results, a material used in various compositions in which rehydration occurs during the setting process subsequent to the addition of the water. When two molecules of water are removed from the molecular structure of gypsum, the anhydrite results. Anhydrites formed by calcining at low temperatures are able to rehydrate when exposed to moist conditions. However, if the calcium sulfate is calcined at high temperatures, typically of about 900° F. or more, an insoluble form of calcium sulfate results.

For example, gypsum ($CaSO_4.2H_2O$) powder, from sources such as rocks of natural gypsum crushed to make gypsum powder or synthetic gypsum made to be a powder, is heated to a temperature of generally about 250° F.-360° F. The powder converts to hemihydrate which takes the form of $CaSO_4.1/2H_2O$. When the hemihydrate is heated to even higher temperatures, the gypsum converts to soluble anhydrite or insoluble anhydrite $CaSO_4$ (dead burn). At high enough temperatures, some of the $CaSO_4$ converts to CaO (quicklime), giving the dead burn a high pH.

Examples of calcium sulfates manufactured by the United States Gypsum Company of Illinois include.

Landplaster: Chemically, landplaster is a dihydrate form of calcium sulfate—$CaSO_4.2H_2O$. It is manufactured by grinding gypsum rock to a fine particle size in a roller mill. The median particle size of landplaster is around 30 microns. Landplaster is typically about 80-98 wt % calcium sulfate dihydrate.

Terra Alba: Chemically, Terra Alba also is a dihydrate form of calcium sulfate—$CaSO_4.2H_2O$. It is made by fine grinding and air separating a select, white, high-purity gypsum containing about 20% water of crystallization. The median particle size of Terra Alba is around 12 microns.

HYDROCAL (C-Base Gypsum Cement): Chemically, HYDROCAL (C-Base Gypsum Cement) is hemihydrate (alpha) form of calcium sulfate—$CaSO_4.1/2H_2O$. The primary use of HYDROCAL cement is in the manufacturing of building products such as joint compound and industrial products such as industrial plasters SNOW WHITE F&P: Chemically, SNOW WHITE F&P is an insoluble anhydrous form of calcium sulfate. It is manufactured by high temperature calcination of the oversize portion of air classified high-purity landplaster. Only a small specially sized fraction of the high purity landplaster is suitable for producing dead burn. Particles that are too small will agglomerate into amorphous balls and particles that are too big will not calcine completely or will take longer to calcine completely. The calcined material is ground and air separated into a bright white powder. The median particle size of SNOW WHITE F&P is around 8 microns. Its main use is in food and pharmaceutical formulations. The combined water content of SNOW WHITE F&P is less than 0.35%.

CAS-20-4: Chemically, CAS-20-4 is an insoluble anhydrous form of calcium sulfate. It is manufactured by high temperature calcination of a high purity gypsum rock, and, like the Snow White Filler, requires a specially sized fraction of the high purity landplaster. CAS-20-4 is extremely white in color, and its median particle size is around 4 microns. The combined water content of CAS-20-4 is less than 0.20%. The high temperatures required for production of CAS often result in partial conversion of the CaSO4 to lime and as a result the CAS has a high pH.

Another anhydrite (dead burn) calcium sulfate filler available from US Gypsum Co. is CA-5 anhydrous or dead burn calcium sulfate filler which has twice the surface area of SNOW WHITE filler. The ball milling required to produce CA-5 causes the surface of the particles to fracture and the ragged surface attracts adsorbed water. This adsorbed water renders the milled dead burn filler unsuitable for some applications.

There are a wide variety of anhydrite forms. For example, there are soluble and insoluble forms according to their respective abilities to chemically absorb water. Anhydrite III (AIII) is soluble. Anhydrite II is insoluble. The Anhydrite II (AII) forms may be further divided into AII-s gypsum of poor solubility and the inert AII-u gypsum and inert AII-E (which has a high pH). For purposes of this description AII-s, AII-u and AII-E are all dead burn calcium sulfate anhydrites.

The soluble and insoluble anhydrites produced via high temperature atmospheric calcination can only be produced in nonfibrous forms. If the gypsum is calcined via pressure calcination to produce the alpha crystal form, hemihydrate could be produced in fibrous crystalline forms as well as in nonfibrous crystalline forms. After hemihydrate fibers were made in the slurry, the subsequent drying process may have produced some soluble anhydrite when the fibers were dried at a high enough temperature to produce soluble anhydrite. The fibrous materials have been found useful in reinforcement in a variety of solid matrix materials, such as polymeric resins. Due to the high moisture content of the hemihydrate and the instability and tendency of soluble anhydrite to absorb water, the use of these fibrous soluble anhydrite materials has been limited to matrix materials that are not affected by the chemical water in their formation. Where water is present, higher temperature processing (e.g., where the gypsum is used as filler in thermoplastic melts) can release this water and ruin the product. To make a dead burn fibrous filler product, fibrous hemi-hydrate filler was sent to a secondary calcination process where the fibers were gently calcined at temperatures high enough to produce dead burn, yet not break the fibers. This was an extremely costly process.

Dead burn material has many applications including use as filler in thermoplastics, herbicides, foods and pharmaceuticals, cement, plaster additives, etc. For example, dead burn anhydrous calcium sulfate is useful to reinforce thermoplastic, thermoset or plastisol systems. For example, it may be used to reinforce PVC (polyvinyl chloride) piping. Dead burn anhydrous calcium sulfate can also be employed as a titanium oxide extender. The primary markets in which anhydrous calcium sulfate filler products are sold include plastics, specialty cements, caulks and adhesives. The added value of anhydrous calcium sulfate results from its softness, whiteness, acid resistance, and functionality in cement. However, the production of dead burn material is difficult.

Many methods and devices for calcining gypsum are well known. Traditionally, refractories have been used to calcine gypsum in large kettles having a thickened dome-shaped bottom, and the kettle is heated by gas-fired flames in a brick refractory structure. (See U.S. Pat. No. 3,236,509). Other calcining methods and devices have taken the form of refractoryless kettles which use submerged combustion heating systems within the kettle such as disclosed in U.S. Pat. Nos. 4,626,199, 4,629,419 and 4,744,961. One major objective of both refractory and refractoryless kettles for calcining gypsum has been to produce calcium sulfate hemihydrate, better known as stucco, for use in the production of wallboard.

In contrast to such methods for production of hemihydrate or stucco, U.S. Pat. No. 5,954,497 to Cloud et al., incorporated herein by reference in its entirety, discloses a method and system for calcining gypsum to recover calcium sulfate anhydrite. The recovered anhydrite product may be in the form of soluble calcium sulfate anhydrite which is unstable or insoluble calcium sulfate anhydrite which is stable and often referred to as dead burn.

U.S. Pat. No. 5,954,497 discloses feeding gypsum material through two or more stages of calcining to gradually convert the gypsum to dead burn material. In the first stage, the gypsum material contains chemically-combined water which is released by the heating process to self-fluidize the gypsum powder so it will flow through the apparatus. The gypsum powder in the first stage is generally heated to form a hemihydrate product which occurs in a temperature range of about 250° F. to 380° F., or generally less than 400° F. The material is then passed through at least one subsequent stage, preferably two or more stages, so it is heated sufficiently to form calcium sulfate anhydrite. In the subsequent stages, the method includes the steps of heating and simultaneously fluidizing the material with a fluidization media, preferably air, so it will flow through the subsequent stages of the system. The material is then recovered from the process in a form consisting essentially of calcium sulfate anhydrite. The recovered anhydrite product may be soluble or insoluble depending upon the desired use. The insoluble anhydrite is generally referred to as dead burn material. Preferably, the method involves three steps of calcining the gypsum through three calcining kettles to recover calcium sulfate anhydrite from the third kettle. This process requires the specially sized fraction of landplaster to work, "wasting" the majority fraction of the special high purity landplaster reserves.

U.S. Pat. No. 3,650,689 to Cafferata, incorporated herein by reference, produces anhydrous calcium sulfate by autoclaving in saturated steam at a temperature of at least 205° C. However, this is a minimum theoretical temperature and would be commercially impractical since you would need a very long time at this temperature.

There is a need for improved methods of making calcium sulfate anhydrite.

In this specification, percent compositions are weight percents unless otherwise indicated.

SUMMARY OF THE INVENTION

It is an object of the invention to provide a process for making a anhydrous calcium sulfate, preferably insoluble (dead burn) anhydrous calcium sulfate, from gypsum (calcium sulfate dihydrate).

The present process mixes water with gypsum-containing solids (typically in the form of powder) to form a 10-70 wt. % solids feed slurry and then subjects the feed slurry to high temperature and pressure. If desired, the slurry would contain 20 to 60 wt. % solids or 30 to 50 wt. % solids.

The method may be performed in any high temperature/high pressure reactor capable of handling the slurry. Preferably the feed slurry is held in the reactor at conditions for calcining the gypsum to convert 95 to 100% of the gypsum to dead burn calcium sulfate anhydrite and the calcium sulfate anhydrite of the calcined slurry is separated from the free water of the calcined slurry to recover at least 95% of the dead burn calcium sulfate anhydrite. Because the gypsum is in slurry, all portions of the high purity landplaster can be used, even the "fines" portion of the landplaster (which would have to be rejected in existing atmospheric high temperature processes).

One embodiment employs a stainless steel pipe as a reactor. A typical suitable stainless steel pipe is capable of handling, e.g., over 1000 psia pressure and 550° F. temperature. The reactor may be fed by a pump, e.g., a progressive cavity pump. The reactor could be heated in one or more of a variety of ways, such as an electric mantle, heating jacket with high temperature fluid (liquid or steam), fluidized bed of hot sand, injection of steam into the slurry, and direct heating, for example, flames fed by natural gas. If desired multiple pipe reactors could be operated sequentially or in parallel.

Typically the slurry is maintained in the reactor at an anhydrite forming temperature of about 500 to 700° F., typically about 550 to 650° F. or about 550 to 600° F. The residence time of the slurry in the reactor at the anhydrite forming temperature ranges from about 10 seconds to several minutes, e.g., 2 to 10 minutes (preferably just long enough to insure calcination to the core of the largest particles of gypsum in the slurry). Factors which affect the time to reach the anhydrite forming temperature include the size, e.g., diameter, of the reactor and the temperature outside the reactor, and the degree of calcination desired. The temperature sets the pressure because the slurry in the reactor contains saturated liquid water. For example, a pressure of 1000 psia corresponds to a temperature of about 545° F. Not counting steam which may be fed to the reactor to provide heat, generally, at least 95% of the water of the slurry remains liquid in the reactor during calcination.

Processing downstream of the reactor depends at least in part on the solids content of the calcined slurry. Slurries having higher solids content (e.g., greater than 55% solids) could discharge as a dry powder. For example, hot water of slurry at 600° F. will flash off when discharged from the reactor into a receiving vessel at atmospheric pressure.

Water in slurries having lower solids content (e.g., 20 to 55% solids) would probably flash off as steam, when the slurry is discharged from the reactor to a receiving vessel at atmospheric pressure, such that the solids from the discharged slurry form a dry powder. However, if needed the discharged slurry could be dewatered and then dried, or simply spray dried.

In some instances slurries having much lower solids content (e.g. 10-20 wt. % solids) are employed to produce thin fibers of anhydrous material. These thin fibers are advantageous because they would already be in the form of anhydrite (dead burn) and would not require further processing. If a fine non-fibrous particle were desired, the fibers would readily break and would be relatively easy to mill into superfine anhydrous filler. The calcined anhydrous gypsum slurry having this much lower solids content, if the water does not flash off, could be dewatered, for example in a filter press, and then dried. If dewatering is employed, the solids are kept hot during dewatering to avoid rehydration of the crystals.

Although the present process may produce any dead burn gypsum filler product, it is especially beneficial for producing anhydrous fillers having high aspect ratios (fibers), e.g. fibers having an average aspect ratio of at least 4:1, or very fine particle size below 2 micrometers combined with very low water content below 0.5 wt. %, preferably below 0.3 wt. %.

Thermodynamically, calcination of gypsum to anhydrous α-calcium sulfate via a slurry process takes less energy and occurs at lower temperatures than dry atmospheric calcination to produce anhydrous calcium sulfate (derived from β-calcium sulfate hemihydrate). The process can be made more energy efficient if heat is recovered.

In another embodiment the invention could replace the pipe reactor with one or more autoclaves at high temperature and high pressure. The autoclaves could have a gas or electric heated jacket, or be placed in a hot sand fluidized bed, or steam could be bubbled into the autoclave, or steam could be fed through a jacket about the autoclave.

If desired, the slurry could be subjected to wet grinding while maintaining the slurry at a high temperature and pressure (above 400° F. and 250 psi). Typical wet grinding is performed by passing the slurry through one or more bead mills employing grinding beads to achieve ultra fine particle size (below 2 micrometers average particle size) while the process produces stable anhydrite with very low water content (below 0.3 wt. %). This aspect of the invention could be performed with any high temperature and high pressure reactor equipped for bead milling. The reactor could be in either a horizontal or vertical configuration fitted with a bead stirring agitator. Typical embodiments employing wet grinding include a horizontal bead mill within the pipe reactor or a vertical bead mill within the autoclave. Employing a bead mill, at high temperature, high pressure slurry conditions, reduces or eliminates the moisture pick-up normally encountered when milling a dry anhydrous powder.

In its product aspects the present invention may provide loose particles comprising at least 90 or at least 95 wt. %, preferably at least 98 wt. %, dead burn calcium sulfate anhydrite on a solids basis, and less than 0.3 wt. % water content on a total weight basis. Typically the particles may be particles having of 1 to 9 micrometers average particle size. Preferably, the particles consist essentially of dead burn calcium sulfate anhydrite.

DETAILED DESCRIPTION OF THE PREFERRED EMBODIMENTS

The process may be performed in any high temperature/high pressure reactor capable of handling the slurry at conditions to promote conversion of calcium sulfate dihydrate to the anhydrite.

Figure 1:
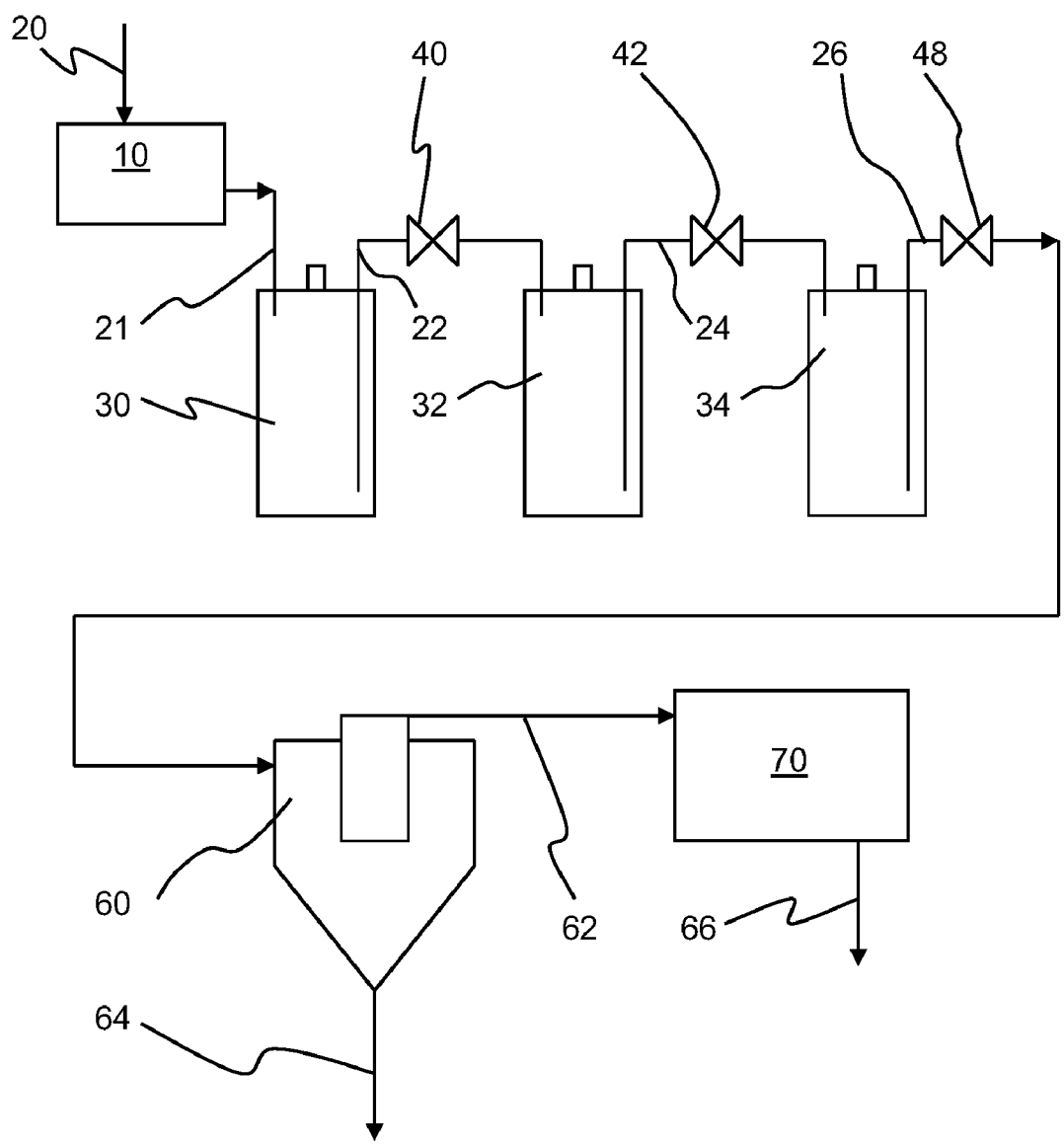
FIG. 1 is a process flow diagram of an apparatus for performing a first embodiment of the process of the present invention.

FIG. 1 shows a first embodiment of an apparatus for performing the process of the present invention. The embodiment employs stainless steel reactors 30, 32, 34 in series. The reactors 30, 32, 34 could be heated reactors, autoclaves or bead mill reactors having screens and loose beads or a combination of these reactors. If desired a combination of reactor types could be employed. For example, reactors 30, 32 could be heated reactors or autoclaves and reactor 34 could be a bead mill reactor. Typically, the autoclaves are provided with one or more impellers (not shown) to stir the slurry in the autoclave.

In this embodiment, gypsum (calcium sulfate dihydrate) and water are mixed in a mixer (not shown) to form a 10-70 wt. % solids feed slurry 20. Preferably the slurry would contain 20 to 60 wt. % solids or 30 to 50 wt. % solids.

The feed gypsum may be any form of gypsum (calcium sulfate dihydrate), such as landplaster, gypsum mineral from ground or unground sources, synthetic gypsum from flu-gas desulfurization processes, or other chemical gypsum having at least 90 wt. % gypsum, preferably at least 95 weight % gypsum, such as high purity landplaster. The median size of landplaster particles is around 30 microns.

The gypsum feed slurry 20 is fed to a progressive cavity pump 10, or another type pump capable of delivering the slurry 20 to the reactor 30 through a conduit 20. These reactors 30, 32, 34 have impellers to stir the contents of the reactors. The reactors 30, 32, 34 are then closed and heated to the anhydrite forming temperature of 500 to 700° F., typically 550 to 650° F. or 550 to 600° for converting the gypsum to calcium sulfate hemihydrate. The calcium sulfate anhydrite is maintained in the reactors 30, 32, 34 at the anhydrite forming temperature for a sufficient residence time, to form dead burn insoluble anhydrite. Typically the slurry 20 is maintained in the reactors at the anhydrite forming temperature, for example, 500 to 700° F., for a residence time ranging from 10 seconds to 2 hours, 10 seconds to 30 minutes or 10 seconds to 15 minutes. However, including heat-up time the residence time in the reactors could be longer than these ranges. Pressure in the reactors 30, 32, 34 corresponds to temperature because the water in the reactors 30, 32, 34 is at saturated conditions. For example, excluding steam which may be fed into the reactors 30, 32, 34 to provide heat, at least 95 wt. % of the water in the reactors 30, 32, 34 is liquid. In one embodiment, the reactors 30, 32, 34 operate at about 1000 psia pressure and about 545° F. temperature.

Accordingly, the conversion to anhydrite occurs in the reactors 30, 32, 34 while the gypsum is contained in the slurry 20. The reactors 30, 32, 34 could be heated in a variety of ways, such as an electric mantle, heating jacket with high temperature fluid (liquid or steam), immersion in a hot sand fluidized bed, and direct heating, for example, flames fed by natural gas or a combination of heating methods.

After conversion to anhydrite is complete a valve 48 is opened and the anhydrite-containing slurry at high pressure and temperature discharges from the third reactor 34 through conduit 26 to a cyclone 60. In the cyclone 60 water and anhydrite are separated while avoiding rehydration of the anhydrite. Cyclone 60 could be heated to prevent condensation of steam.

In the cyclone the water of the discharged anhydrite-containing product slurry flashes off the anhydrite particles to form steam. The finer anhydrite particles and steam discharge from the cyclone 60 as stream 62 while the dried larger anhydrite particles drop down through the cyclone 60 and discharge from an opening in the bottom of the cyclone 60 as stream 64. The stream 62 may pass into another particle separation device (for example, a bag house 70) to remove anhydrite fines 66.

The partial discharge of reactor 34 results in a drop in pressure. Thus, the valve 42 opens and allows some slurry in from reactor 32 until reactors 32, 34 equilibrate. Now reactor 32 has a lower pressure and the valve 40 opens to let some slurry in from reactor 30 until reactors 30, 32 equilibrate. Pump 10 feeds make up slurry 20 into the reactor 30.

When pressure is released in the reactors 30, 32, 34 as well as the cyclone 60, temperature of the water and gypsum is maintained above 205° C. to prevent rehydration of the anhydrite.

If desired, the slurry 20 could be subjected to wet grinding while at high temperature (above 500° F.) and high pressure within one or more of the reactors 30, 32, 34 by converting one or more of these reactors to a bead mill (stirred beads or grinding media mills) by changing the impeller to a media stirring impeller and including beads or other grinding media in the reactor. The bead mill employs grinding beads or other grinding media to produce anhydrite having desired particle size (for example between 1 and 9, or 1 to 5, micrometers average particle size) combined with very low water content (below 0.3 wt. %).

If desired the particles can be relatively monosized having a narrow particle size distribution. For example, the product may be loose particles having a top size of 6 microns, comprising at least about 90 wt. %, or at least about 95 wt. %, insoluble calcium sulfate anhydrite on a solids basis and less than about 0.5 wt. % water content on a total weight basis. If desired the particles may have a bottom size of 0.4 microns, 0.2 microns or less. Also, if desired the particles may have a top size of 2.5 microns.

Advantageously the particles may have a narrow particle size range such as a range in which 90% or 95% of the particles have a particle size in the range of 0.5 and 5 microns or in the range of 0.4 and 2.5 microns. Also, advantageously the particles comprise less than about 0.3 wt. % water content on a total weight basis. If desired the particles may be made to have at most about 2 micrometers average particle size or an average particle size of about 1 to 2 micrometers.

Another advantage of the present slurry process is that decomposition to CaO which can occur in the MKD process can not occur in the present slurry process. As a result the present process is advantageously relatively pH neutral. Thus, the pH of the anhydrite product can be about that of the gypsum starting material. For example, the pH of the anhydrite product may be at most 0.1 higher than the pH of the gypsum starting material if the water used to make the starting gypsum slurry in the process is neutral. If desired, the pH of the anhydrite product could be easily adjusted with a base or acid in the starting slurry.

Thus, advantageously an embodiment the present invention provides loose particles having a top size of 6 microns, comprising at least about 90 wt. % insoluble calcium sulfate anhydrite on a solids basis and less than about 0.5 wt. % water content on a total weight basis, made according to the slurry process of the present invention, wherein the loose particles have a pH of at most 0.1 higher than the pH of the particles comprising calcium sulfate dihydrate fed to the first reactor. Alternatively, the pH of the anhydrite can be adjusted with an acid (such as $H_2SO_4$) or a base (such as CaO). Feed and product pH can be compared by placing a predetermined amount of the dry feed into a predetermined amount of distilled water and measuring its pH, placing the same predetermined amount of product particles into the same predetermined amount of distilled water and measuring its pH, and then comparing the measured pH levels.

The equipment used to agitate and wet grind the suspension of slurry is known as a stirred media mill, for example a bead mill, and is characterized in that it uses a particulate milling medium to effect agitation and milling. This particulate mixing medium has an average particle size of 6 mm or smaller. Preferably, the average particle size is from 0.2 mm to 2 mm.

The particulate mixing medium is suitably sand, glass beads or ceramic beads. Typically, ceramic beads formed from yttria stabilized zirconia or zirconium silicate are used as the mixing medium.

The aqueous suspension is agitated in the bead mill for at least about 4 seconds. The optimum period for which the aqueous suspension is agitated depends upon a number of factors including the design and efficiency of the mill used, and the concentration of the suspension and particle size desired. Typical total residence time in the bead mills (or time in the single bead mill if only one is employed) can range from about 4 seconds to about 15 minutes.

Bead:slurry volume ratio typically ranged from about 0.4:1 to about 2:1.

Typical reactor temperature conditions in the bead mixer ranged from about 550° F. to about 600° F.

It is sometimes convenient to pass the aqueous suspension through more than one bead mill.

Typically stirred media mills employ an agitator tip speed of about 5 to 15 meters per second.

Figure 2:
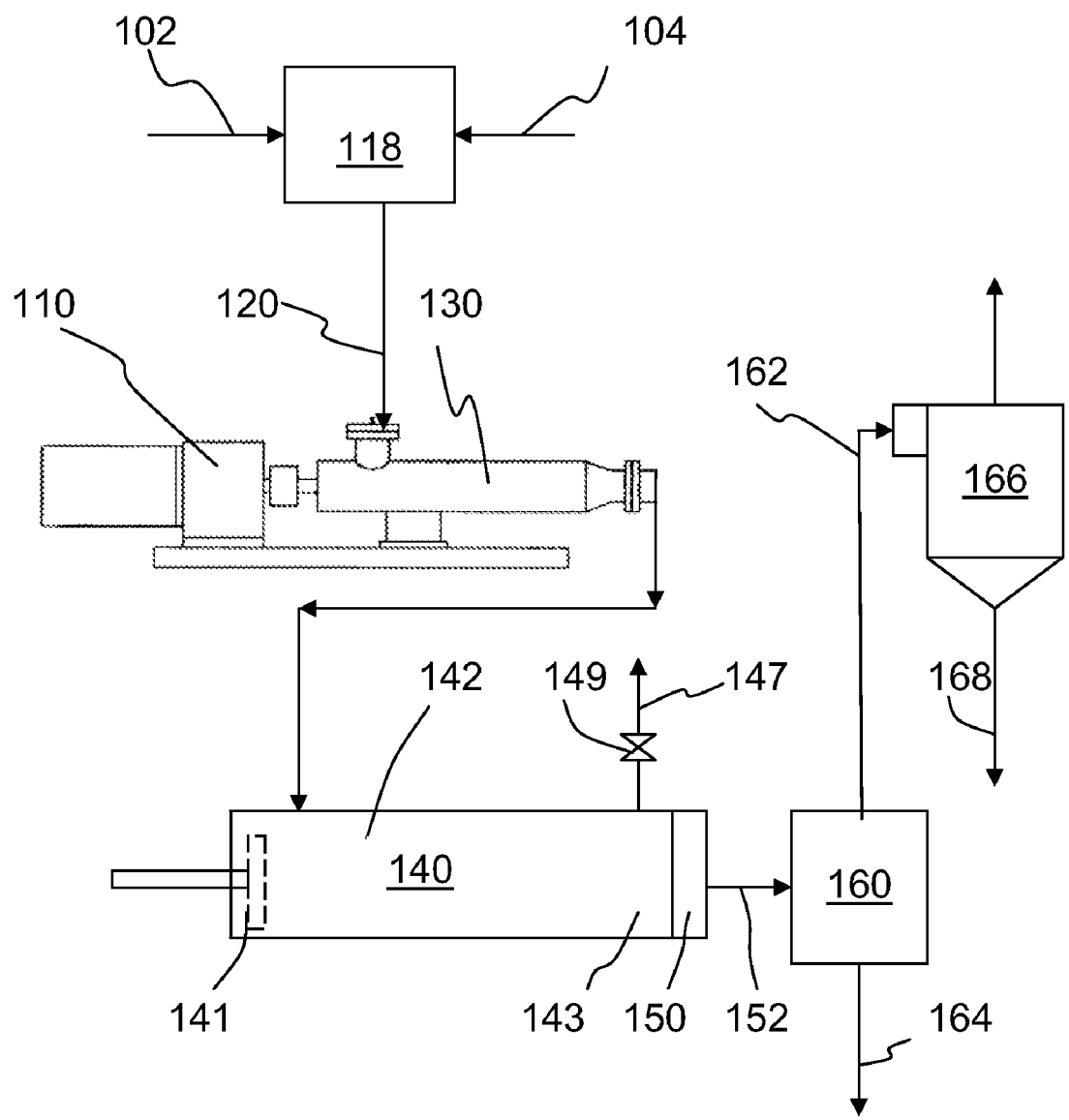
FIG. 2 is a process flow diagram of an apparatus for performing a second embodiment of the process of the present invention.

FIG. 2 shows a second embodiment of an apparatus for performing the process of the present invention. The embodiment employs a stainless steel tube or pipe reactor 140. The stainless steel tube or pipe reactor 140 could be replaced by other metal or non-metal pipes capable of handling the desired high temperature and pressure reaction conditions. A typical pipe reactor 140 would have an inside diameter of about 2 to 4 inches.

In this embodiment, gypsum (calcium sulfate dihydrate) 102 and water 104 are mixed in a mixer 118 to form a 10-70 wt. % solids feed slurry 120. Preferably the slurry would contain 20 to 60 wt. % solids or 30 to 50 wt. % solids.

The feed gypsum 102 may be any form of gypsum (calcium sulfate dihydrate), such as landplaster, gypsum mineral from ground or unground sources, synthetic gypsum from flu-gas desulfurization processes, or other chemical gypsum having at least 90 wt. % gypsum, preferably at least 95 weight % gypsum, such as high purity landplaster. The median size of landplaster particles is around 30 microns.

The gypsum feed slurry 120 is fed to a progressive cavity pump 130 powered by a gear motor drive 110, or another type pump capable of delivering the slurry 120 to the pipe reactor 140. The reactor 140 is then closed and heated to the anhydrite forming temperature of 500 to 700° F., typically 550 to 650° F. or 550 to 600° F. for converting the gypsum to calcium sulfate hemihydrate. Accordingly, the conversion to anhydrite occurs in the reactor 140 while the gypsum is contained in the slurry 120. The reactor 140 could be heated in a variety of ways, such as an electric mantle, heating jacket with high temperature fluid (liquid or steam), immersion in a hot sand fluidized bed, and direct heating, for example, flames fed by natural gas or a combination of heating methods.

The calcium sulfate anhydrite is maintained in the reactor 140 at the anhydrite forming temperature for a sufficient residence time, to form dead burn insoluble anhydrite. Typically the slurry 120 is maintained in the reactor 140 at the anhydrite forming temperature for a residence time ranging from 10 seconds to 2 hours, 0.25 to 1 hour or 0.25 to 0.5 hours. Pressure in the reactor 140 corresponds to temperature because the water in the reactor 140 is at saturated conditions. For example, excluding steam which may be fed into the pipe reactor 140 to provide heat, at least 95 wt. % of the water in the reactor 140 is liquid. In one embodiment, the stainless steel pipe reactor 140 operates at about 1000 psia pressure and about 545° F. temperature.

After conversion to anhydrite is complete a pressure lock 150 is opened and the anhydrite-containing slurry at high pressure and temperature discharges from the reactor 140 to a receiving vessel 160. The pressure lock 150 could, for example, be a single hatch door or a pair of hatch doors in series wherein the first door is at the entry to the pressure lock and a second door is at the exit from the pressure lock 150. Receiving vessel 160 has a sufficient diameter such that the discharged slurry 152 traveling generally horizontally into the receiving vessel 160 does not hit against a far wall of the receiving vessel 160. After the slurry 152 discharges from the reactor 140 due to the force of the released pressure, a plunger 141 moves along the length of the reactor 40 from the upstream end 142 to the downstream end 143 to push any remaining slurry or powder into the receiving vessel 160.

If desired, the reactor 40 may include a pressure release conduit 147 having a valve 149. Prior to opening the pressure lock 150 the valve 149 may be opened to reduce pressure by releasing steam.

In the receiving vessel 160 water and anhydrite are separated while avoiding rehydration of the anhydrite. The water of the discharged anhydrite-containing product slurry 152 flashes upwardly off the anhydrite particles and discharges as steam stream 162 while the dried anhydrite particles drop down through the receiving vessel 160 and discharge from an opening in the bottom of the receiving vessel 160 as stream 164. The steam stream 162 may pass into another particle separation device (for example, a bag house or cyclone 166) to remove anhydrite fines 168.

Figure 3:
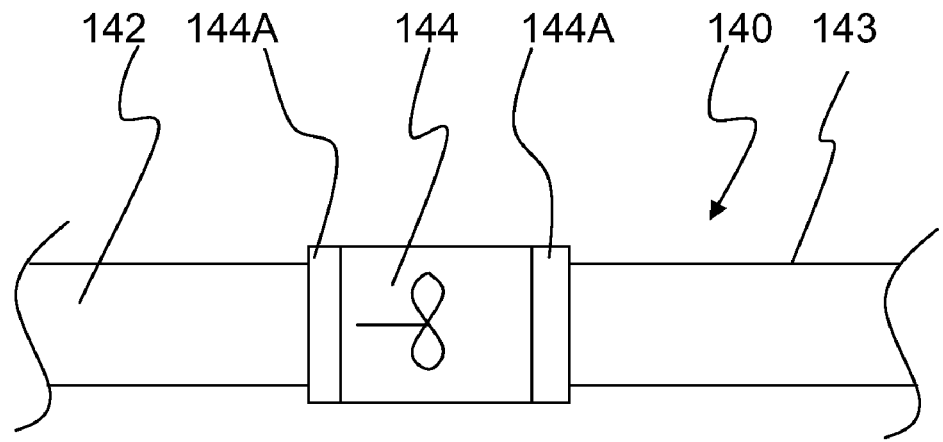
FIG. 3 is process flow diagram of an embodiment of the reactor of the embodiment of FIG. 2 modified to include a bead mill.
Figure 4:
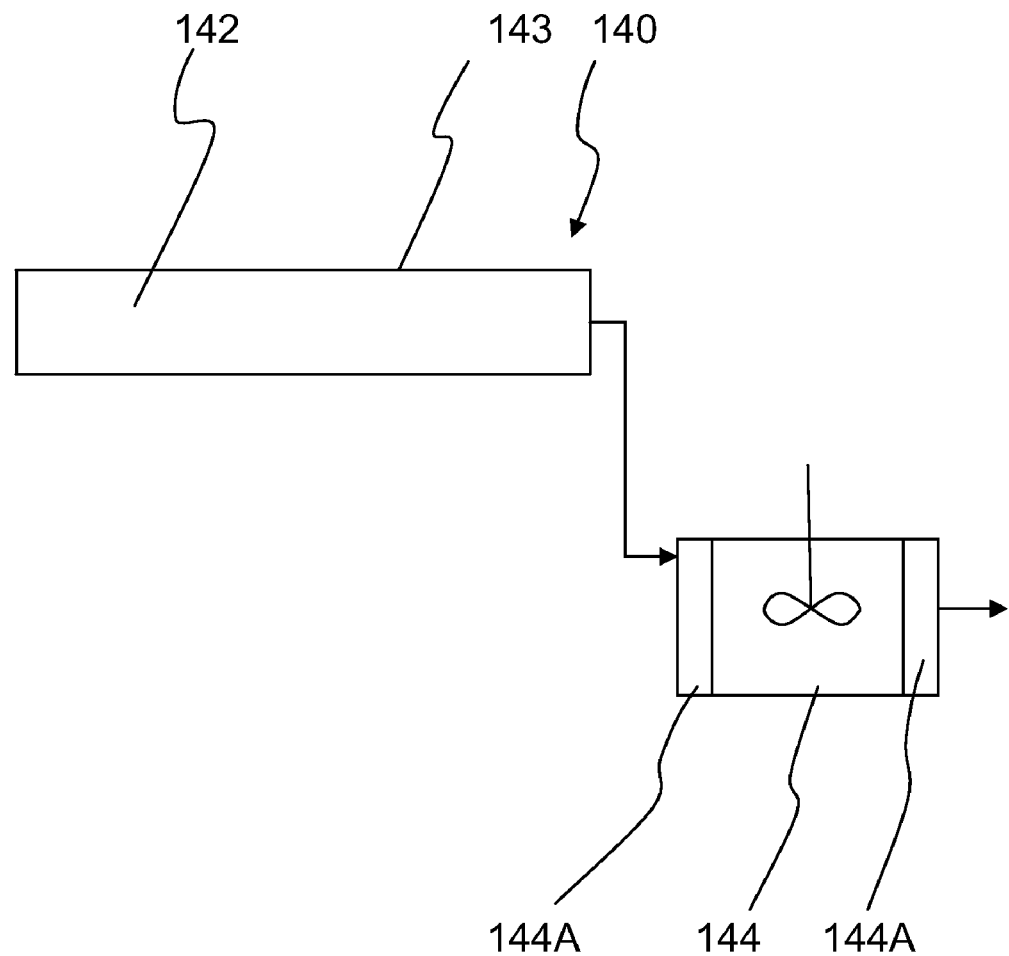
FIG. 4 is process flow diagram of another embodiment of the reactor of the embodiment of FIG. 2 modified to include a bead mill.

If desired, the slurry 120 could be subjected to wet grinding while at high temperature (above 500° F.) and high pressure within the reactor 140 (FIG. 3) or downstream of the reactor 140 (FIG. 4).

FIG. 3 shows wet grinding is performed by providing the reactor 140 with a bead mill 144 and passing the slurry through the bead mill 144. The bead mill 144 employs grinding beads to produce anhydrite having ultra fine particle size.

FIG. 3 shows the horizontal pipe reactor 140 provided with a horizontal bead mixer (bead mill) 144 between the upstream end 142 and downstream end 143 of the reactor 140 to wet grind the dead burn anhydrite to an average particle size of, for example, about 2 to 20 microns or about 2 to 5 microns or at or below 2 micrometers average particle size. The wet grinding is performed before the slurry in the reactor 140 cools to a temperature below 400° F. and drops in pressure to below 250 psia.

Typically this wet grinding achieves a product with very low water content (below 0.3 wt. %). Grinding normal dead burn in atmosphere to 2 micron size would cause the freshly ground surfaces to pick up undesired moisture from the atmosphere. In contrast, bead milling carried out during calcination to anhydrite, while at high temperature high pressure slurry conditions, reduces or eliminates the moisture pick-up normally encountered when milling a dry anhydrous powder. Also, bead milling slurry which contains α-calcium sulfate anhydrite at high temperature and pressure produces small particles of low water content anhydrite which are smoother than particles produced by milling a dry anhydrous powder.

FIG. 4 shows the horizontal pipe reactor 140 provided with a bead mill 144 at a downstream end 143 of the reactor 140 to wet grind the dead burn anhydrite to an average particle size of, for example, about 2 to 20 microns or about 2 to 5 microns. The wet grinding is performed before the slurry in the reactor 140 cools to a temperature below 400° F. and drops in pressure to below 250 psia.

If a wet grinder with grinding beads is employed either as the reactor or part of the reactor or just downstream of the reactor, then the bead:slurry volume ratio in the chamber containing both beads and slurry typically ranges from about 0.4:1 to about 2:1 and a grind time as described above.

Figure 5:
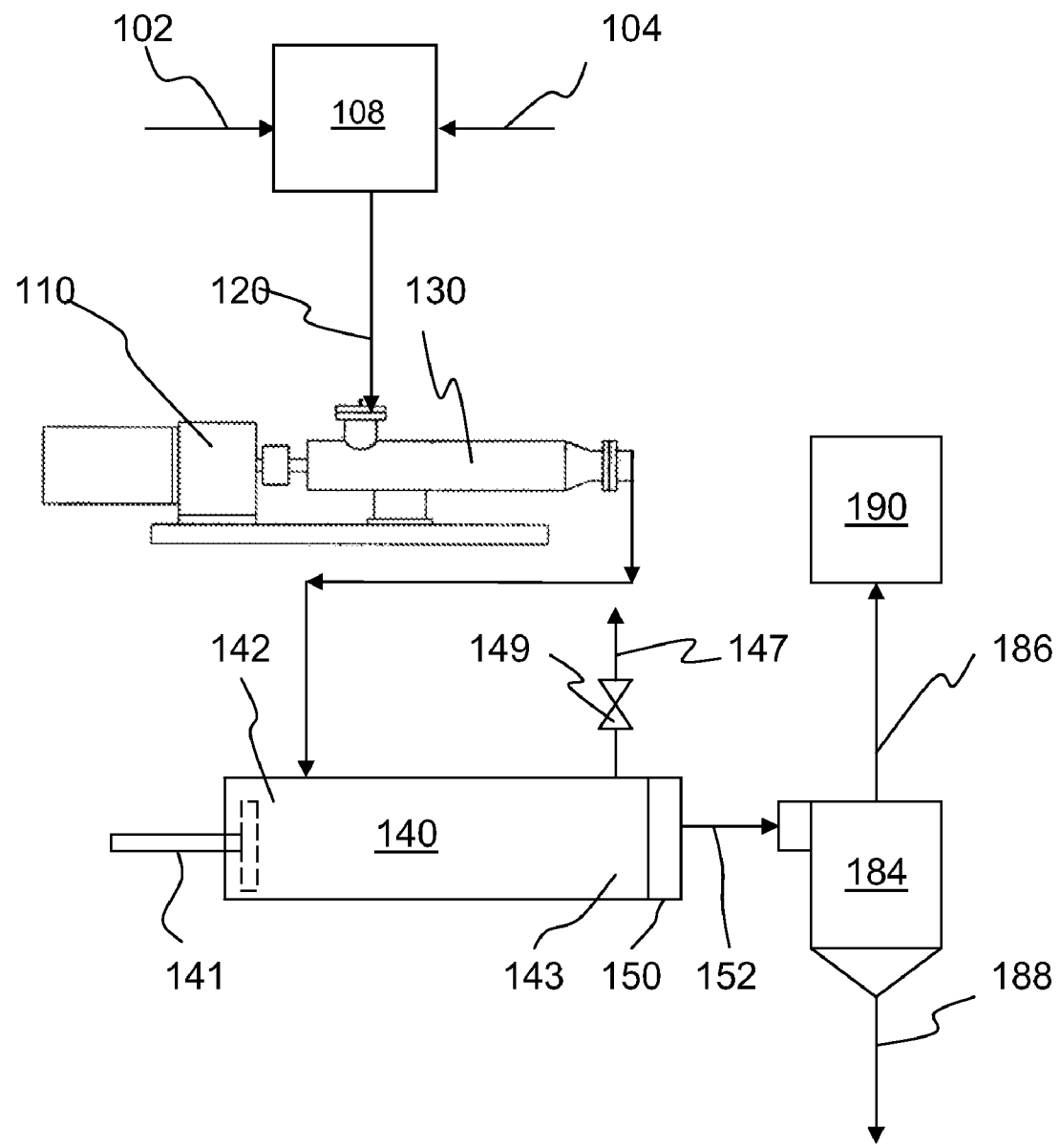
FIG. 5 is a process flow diagram of a second embodiment of the process of the present invention which is the process of FIG. 2 modified to discharge slurry from the reactor directly into a cyclone.

FIG. 5 shows the embodiment of FIG. 2 modified to discharge the slurry 152 from the pressure lock 150 directly into a cyclone 184. In the cyclone 184 the free water on the anhydrous gypsum particles flashes off the particles to form a stream 186 of steam and fine particles which travel upwards out of the cyclone 184 and feeds a bag house 190. The coarser anhydrous gypsum particles travel downwards out of the cyclone 184 as stream 188.

In the embodiments of FIGS. 1-5, if the slurry discharged from the reactor 40 had more free water than would flash off upon discharge from the reactor 40, then the wet discharged anhydrous gypsum particles could (in embodiments not shown) be subjected to wet pressing followed by drying in an oven or be subjected to spray drying to remove excess water.

Figure 6:
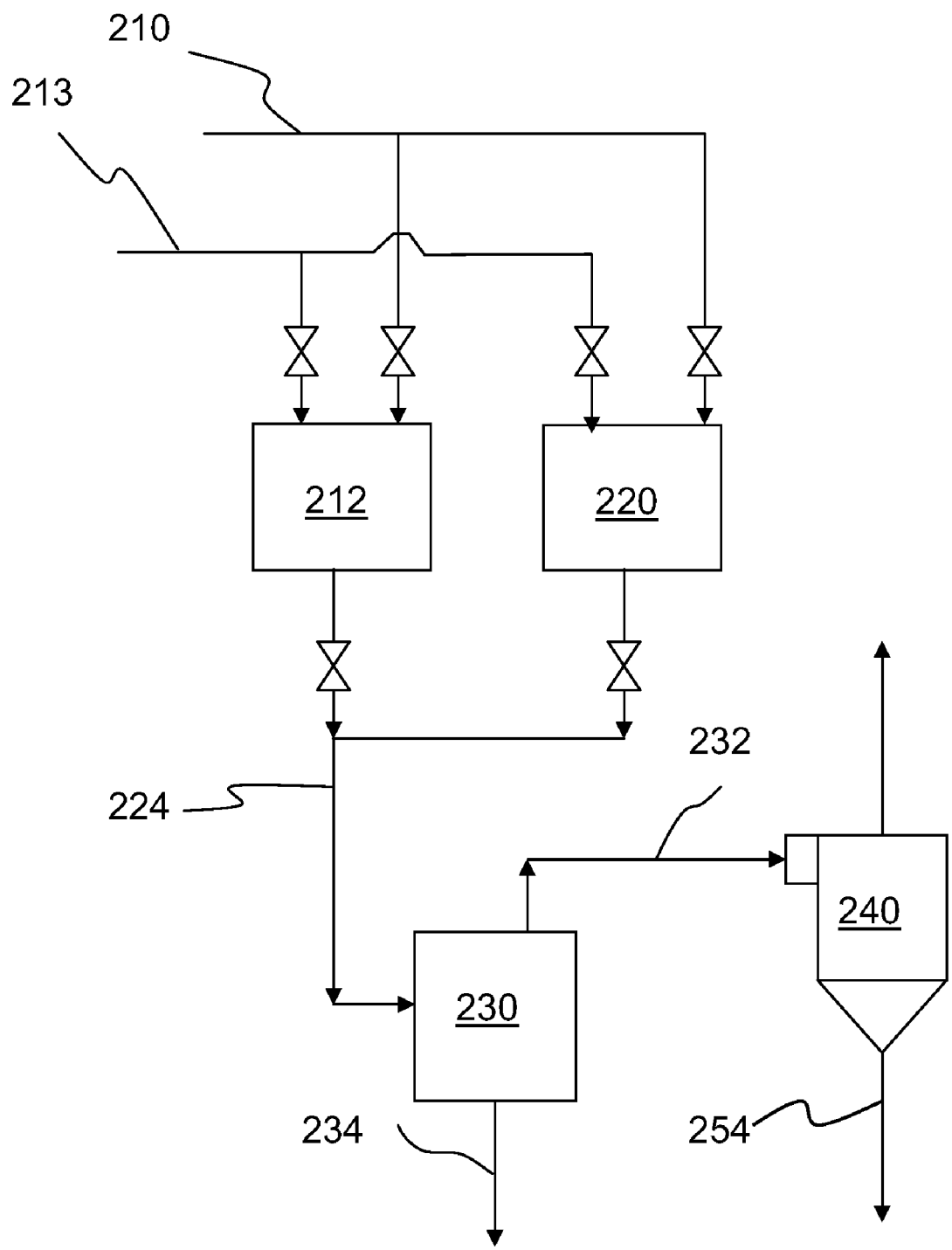
FIG. 6 is a process flow diagram of a third embodiment of the process of the present invention which is the process of FIG. 2 modified to replace the single pipe reactor with a pair of autoclaves or a pair of pipe reactors.

FIG. 6 shows another embodiment of an apparatus for performing the process of the present invention. In this embodiment the single pipe reactor 140 is replaced by one or more one reactors 212, 220. The reactors 212, 220 could be parallel pipe reactors or jacketed autoclaves. First reactor 212 and second reactor 220 can operate in a batch process in which they are both fed simultaneously and then they both discharge simultaneously. Or if desired, they can be operated in a semi-batch process in which they are fed at different times and discharge at different times to alternately feed downstream processing.

The following further describes operating the apparatus of FIG. 6 in a semi-batch process with particular emphasis on its operation while the first reactor 212 is being fed, heated and then discharged. It is understood the same steps performed in the first reactor 212 would be performed in the second reactor 220, but at different times.

Gypsum (calcium sulfate dihydrate) and water are mixed in a mixer (not shown) to form a 10-70% gypsum slurry 210. Gypsum slurry 210 is fed alternately to the reactors 212, 220. In particular, a first batch of slurry is fed to the first reactor 212 and, while calcination occurs in the first autoclave reactor 212, a second batch of slurry 210 is fed to the second autoclave reactor 220. The slurry 210 may be fed through a positive displacement pump (not shown) to the reactors 212, 220 at high pressure, or the slurry 210 may be fed through the pump to the reactors 212, 220 at lower pressure and then pressurized in the reactors 212, 220.

The reactors 212, 220 could be heated in a variety of ways, such as an electric mantle, a heating jacket heated with high temperature fluid (liquid or steam), and direct heating, for example, flames fed by natural gas, or steam could be bubbled into the reactors 212, 220. For example, superheated steam could be bubbled into the slurry in the reactor where the superheated steam transfers its heat to the slurry and condenses to liquid water. Thus, about all of the water in the reactors 212, 220 is liquid. Typically, the autoclave is provided with one or more impellers (not shown) to stir the slurry in the autoclave. FIG. 6 shows steam 213 being fed to a jacket of the reactors 112, 120 to provide heat.

The slurry 210 is fed to the reactor 212 and then the reactor 212 and the slurry contained in the reactor 212 are heated to an anhydrite forming temperature of about 550 to 700° F., typically 550 to 650° F. or 550 to 600° F.

Thus, the reactor 212 calcines the gypsum to convert it to calcium sulfate hemihydrate and then calcium sulfate anhydrite.

For example, the reactors 212, 220 may operate at a pressure of from about 800 psig to about 1500 psig or higher; at a respective residence time of about 10 seconds to about 15 minutes at the anhydrite forming temperature; and a solids percent (excluding beads, if any) of about 10 to 70 weight percent.

Pressure is maintained at the pressure needed to maintain the water in the slurry 210 as saturated liquid water at the reactor temperature. Thus, the pressure is sufficient to prevent substantial formation of steam in the reactor. Accordingly the conversion to anhydrite occurs while the gypsum is completely contained in the slurry.

A variety of heat sources may be employed to heat the reactors as explained above. For example, if using steam as a heat source, then after the reactor 212 is closed, hot superheated steam 213 is delivered to the reactor 212 to heat the reactor 212. The change in temperature and pressure inside the reactor 212 are monitored as a function of time. If using steam, the process would typically use superheated steam at one very high temperature and get the reactor up to max temperature as soon as possible.

The product stream 224 containing calcium sulfate anhydrite and water discharges from the reactor 212 as a slurry and feeds a receiving tank 230 which permits the water of the slurry to flash off as steam 232 while forming a dry anhydrite product stream 234 and avoiding rehydration of the anhydrite. Stream 234 contains particles having a water content (on a total weight basis) of preferably less than 0.5 wt. %, more preferably less than 0.3 wt. %. The steam stream 232 feeds a fine particle collecting device such as a cyclone 240 or bag house (not shown) to remove entrained fines.

Typically, at least 98 wt. % of the gypsum is converted by calcination to calcium sulfate anhydrite having a water content of less than 0.5 wt. %, preferably less than 0.3 wt. %. For example, free moisture, as measured at 45° C., may range from about 0.1 to about 0.3 wt. % and bound moisture, as measured at 240° C., may range from about 0.150 to about 0.8 wt. %.

In an alternative arrangement (not shown) if the slurry 224 discharged from the reactor 212 has too much water to merely flash off in the receiving vessel 230, then the resulting stream 234, containing liquid water and anhydrite particles, can be fed to a dewatering unit such as a wet filter press and then fed to a drier at conditions to remove excess liquid water while avoiding rehydration of the anhydrite. The anhydrous gypsum product, the dewatering unit and drier are kept at a temperature sufficiently high to prevent the anhydrite from rehydrating.

Typically the dry product 234, 254 has less than 0.8 wt. % water, preferably less than 0.6 wt. %, total bound and free water.

If desired, the anhydrite may be wet ground in the autoclave 212, 220 by replacing the autoclave 212, 220 with a high pressure vertical bead mill. The bead mill has beads and rotating bead stirring agitators and screens at its inlet and outlet to permit slurry to pass there through but retain the beads in the reactor.

In another embodiment (not shown) the stream 224 can be sent to a wet grinder, such as the wet grinder 144 of FIG. 4, to grind the gypsum anhydrite particles in slurry stream 224 before the slurry from the reactor 212, 220 cools to a temperature below 400° F. and drops in pressure to below 250 psi.

If a wet grinder with grinding beads is employed either as the reactor or part of the reactor or just downstream of the reactor, then the bead:slurry volume ratio in the chamber containing both beads and slurry typically ranges from about 0.4:1 to about 2:1 and the grind time of the slurry in the presence of beads after the slurry achieves a temperature of 500° F. typically ranges from about 10 seconds to about 15 minutes.

EXAMPLES

TABLE 1 summarizes the conditions for examples of the present invention.

TABLE 1

|  | Example | | | | |
| --- | --- | --- | --- | --- | --- |
|  | 1 | 2 | 3 | 4 | 5 |
| Grinding beads | no | no | no | yes | yes |
| Bead:slurry volume | NA | NA | NA | 0.80:1 | 0.80:1 |

TABLE 1-continued

| | Example | | | | |
|---|---|---|---|---|---|
| | 1 | 2 | 3 | 4 | 5 |
| ratio | | | | | |
| Highest pressure (psi) | 1500 | 800 | 1310 | 1480 | 1310 |
| Residence time (min) | 86 | 120 | 55 | 89 | 61 |
| solids % | 50 | 50 | 25 | 25 | 25 |
| Moisture percent free (45° C.) | 0.046 | 0.016 | 0.063 | 0.214 | 0.119 |
| Moisture percent bound (240° C.) | 0.150 | 0.229 | 0.214 | 0.474 | 0.524 |
| Particle size average | 5.94 | 9.29 | 6.11 | 1.26 | 1.4 |
| Particle size top | 36.5 | 36.5 | 18 | 5.25 | 5.25 |
| Product yield | NM | NM | 99.51% | 99.45 | 94.73% |
| Bead breakage | NA | NA | NA | 0.010 | 0.026% |
| Net bead loss (g) | NA | NA | NA | 1.41 | 10.89 |
| Bead volume (ml) | NA | NA | NA | 350 | 350 |
| Grind time post 500° F. (min) | NA | NA | NA | 43 | 18 |

Notes:
NA means not applicable
NM means not measured

Example 1

This example on slurry calcination was conducted in a 2 liter high temperature and high pressure batch reactor provided with an impeller for stirring its contents.

2.2 pounds (1000 grams) of Terra Alba calcium sulfate and 2.2 pounds (1000 grams) of water were mixed and added to the reactor at about ambient temperature. The target temperature was set to 625° F. The mixture in the closed reactor with stirring at about 1200 RPM was heated for about 86 minutes. During this time the actual temperature rose from the initial temperature to about 608° F. and the pressure was allowed to go to 1500 psia. Then the heating element was shut off. The steam was then bled off from the reactor to release the pressure shortly after the heating element was shut off. The steam escaped, producing a dry anhydrite powder. The residual heat in the reactor ensured a relatively dry powder. The material was left in the reactor overnight to cool. Then particle size analysis and free and combined moisture analysis were done to the sample. The results of the free and combined moisture analysis were as follows: 0.046 wt. % free moisture and 0.15 wt. % combined.

Figure 7:
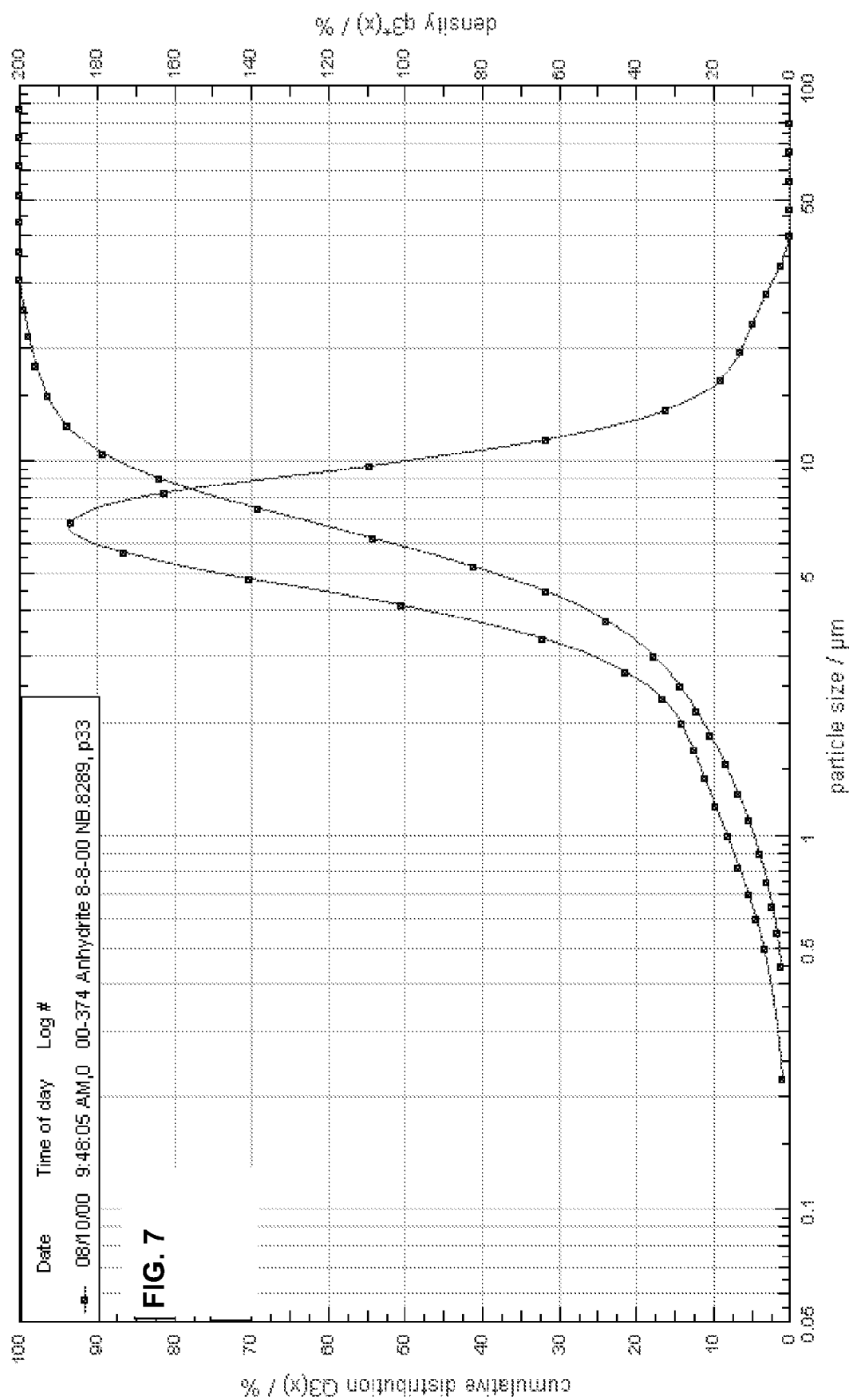
FIG. 7 shows particle size distribution data for a first sample of material made according to the present invention.

FIG. 7 shows the particle size distribution of the resulting anhydrite product.

Figure 8:
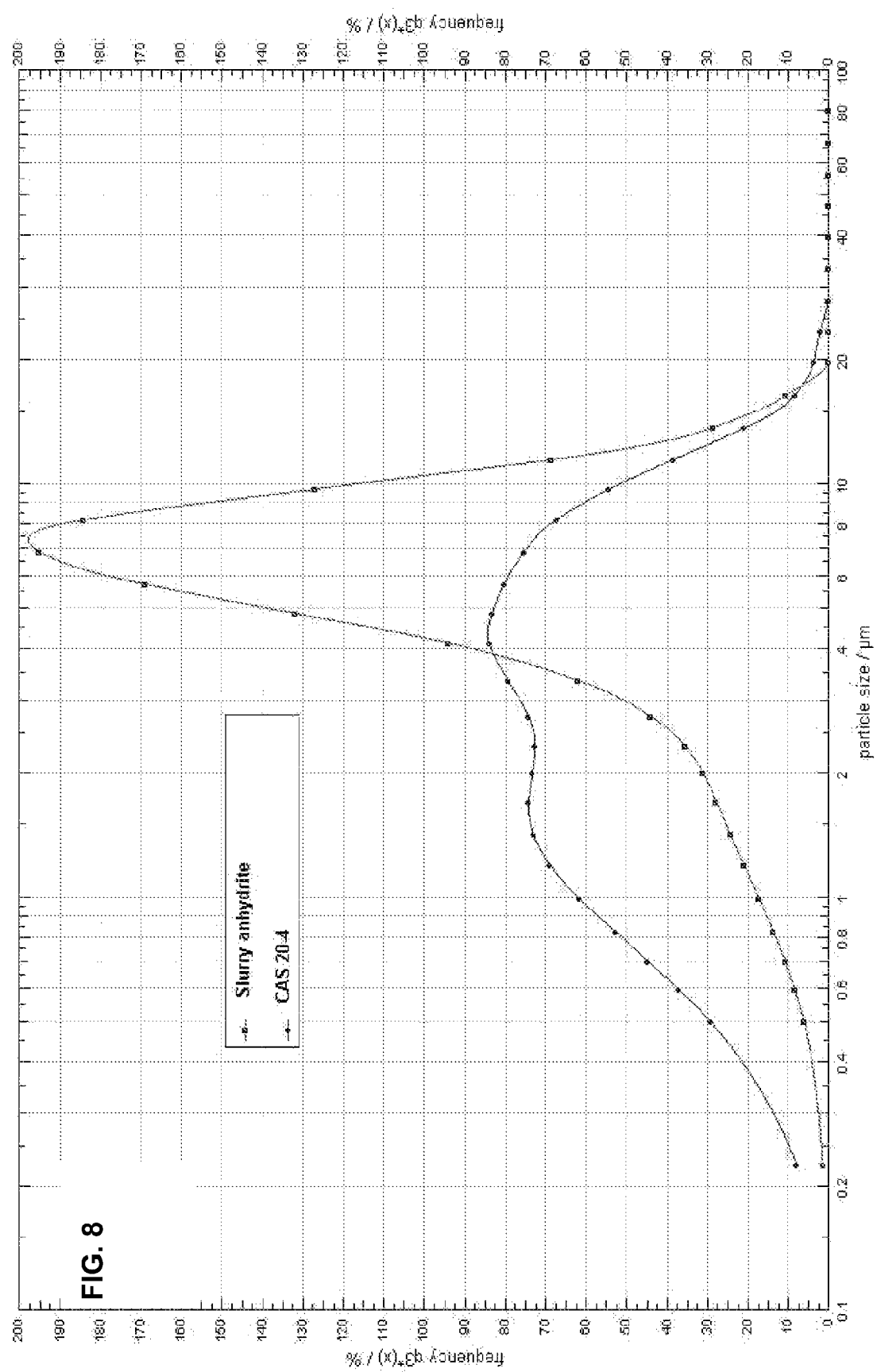
FIG. 8 shows a comparison of the particle size distribution of the resulting anhydrite product of this example of FIG. 5 and CAS 20-4 anhydrous calcium sulfate filler.

FIG. 8 shows a comparison of the particle size distribution of the resulting anhydrite product of this example and CAS 20-4 anhydrous calcium sulfate filler.

Some particle size properties of the resulting anhydrite product are also given in TABLE 2.

TABLE 2

| $X_{10}$ | 1.83 μm |
|---|---|
| $X_{25}$ | 3.88 μm |
| $X_{50}$ | 5.94 μm |
| $X_{75}$ | 8.22 μm |
| $X_{90}$ | 10.92 μm |
| $X_{95}$ | 13.71 μm |
| $S_v$ | 1.69 m²/cm³ |
| $S_m$ | 5.67E+03 cm²/g |
| Vol. Mean | 6.49 μm |
| 635 Mesh | 98.26% |
| 500 mesh | 99.29% |
| 450 mesh | 99.87% |
| 325 mesh | 100% |
| Density | 2.98 g/cm³ |

Example 2

In Example 2 the procedure of Example 1 was substantially repeated to make calcium sulfate anhydrite, but the highest pressure achieved, residence time and solids percent were changed as listed in TABLE 1.

Figure 9:
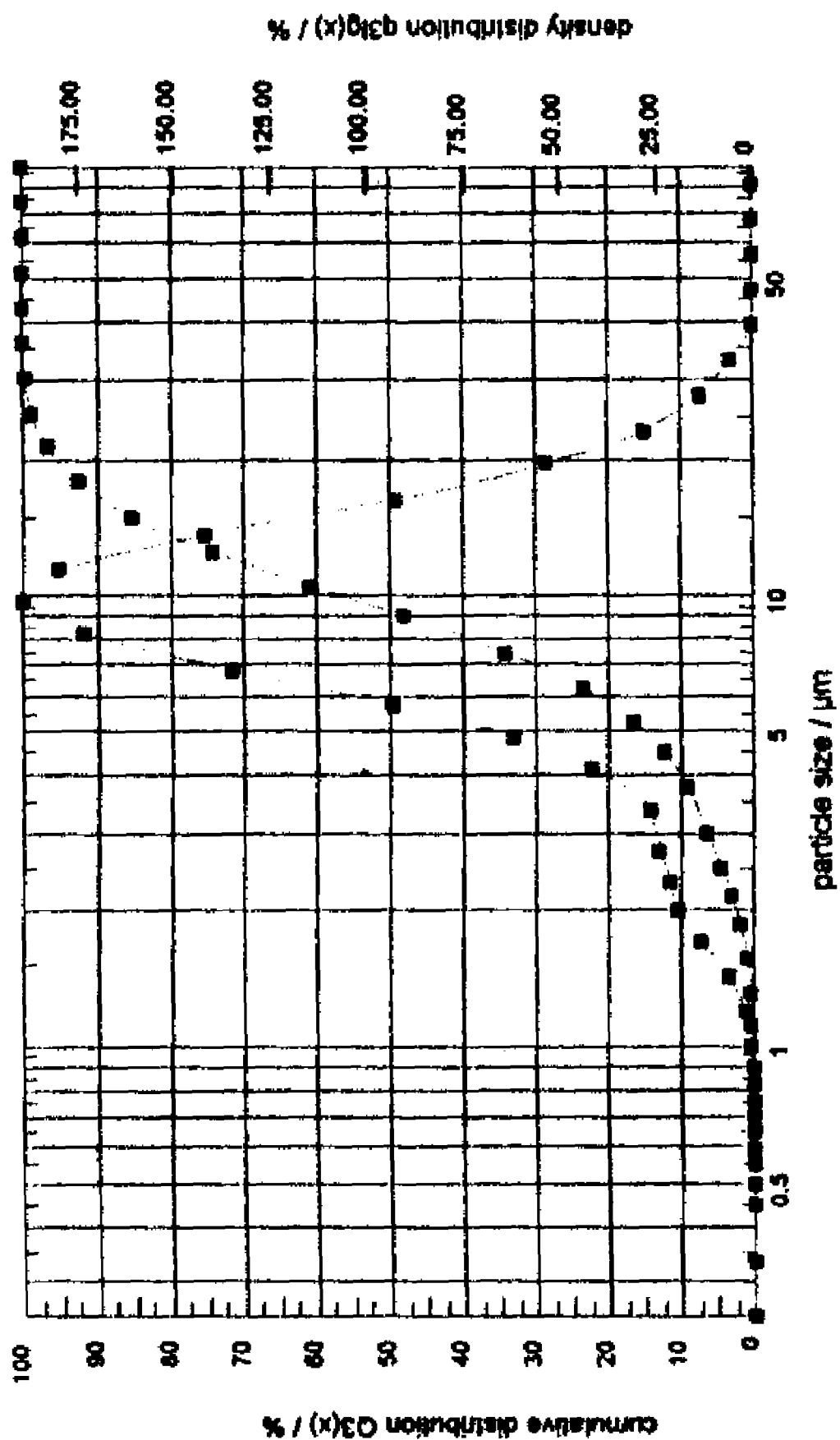
FIG. 9 shows particle size distribution data for a second sample of material made according to the present invention.

The results of the free and combined moisture analysis were as follows: 0.016 wt. % free moisture and 0.229 wt. % bound moisture as listed in TABLE 1. TABLE 3 shows a volume size distribution of the anhydrite product and its data is plotted in FIG. 9. TABLE 4 shows more information of the resulting product.

TABLE 3

| Volume Size Distribution | | |
|---|---|---|
| μm | % Finer | % in |
| 0.45 | 0 | 0 |
| 0.55 | 0 | 0 |
| 0.65 | 0 | 0 |
| 0.75 | 0 | 0 |
| 0.90 | 0 | 0 |
| 1.10 | 0.02 | 0.02 |
| 1.30 | 0.16 | 0.15 |
| 1.55 | 0.65 | 0.47 |
| 1.85 | 1.67 | 1.02 |
| 2.15 | 2.92 | 1.26 |
| 2.50 | 4.34 | 1.41 |
| 3.00 | 6.23 | 1.89 |
| 3.75 | 8.82 | 2.58 |
| 4.50 | 12.09 | 3.28 |
| 5.25 | 16.25 | 4.15 |
| 6.25 | 23.26 | 7.02 |
| 7.50 | 33.91 | 10.65 |
| 9.00 | 47.60 | 13.68 |
| 10.50 | 60.24 | 12.65 |
| 12.50 | 73.81 | 13.56 |
| 15.00 | 85.00 | 11.19 |
| 18.00 | 92.33 | 7.33 |
| 21.50 | 96.44 | 4.11 |
| 25.50 | 98.53 | 2.09 |
| 30.50 | 99.59 | 1.07 |
| 36.50 | 100 | 0.41 |
| 43.50 | 100 | 0 |
| 51.50 | 100 | 0 |
| 61.50 | 100 | 0 |
| 73.50 | 100 | 0 |
| 87.50 | 100 | 0 |

TABLE 4

| $X_{10}$ | 4.02 μm |
|---|---|
| $X_{25}$ | 6.45 μm |
| $X_{50}$ | 9.29 μm |
| $X_{75}$ | 12.77 μm |
| $X_{90}$ | 17.05 μm |
| $X_{95}$ | 20.27 μm |
| $S_v$ | 0.836 m²/cm³ |
| $S_m$ | 2.8E+03 cm²/g |

TABLE 4-continued

| | |
|---|---|
| Vol. Mean | 10.1 μm |
| 635 Mesh | 94.68% |
| 500 mesh | 98.27% |
| 450 mesh | 99.69% |
| 325 mesh | 100% |
| Density | 2.98 g/cm³ |

Example 3

In Example 3 the procedure of Example 1 was substantially repeated to make calcium sulfate anhydrite, but the highest pressure achieved, residence time and solids percent were changed as listed in TABLE 1.

The results of the free and combined moisture analysis were as follows: 0.063 wt. % free moisture and 0.214 wt. % bound moisture as listed in TABLE 1. TABLE 5 shows a volume size distribution of the anhydrite product. TABLE 6 shows additional properties of the resulting product.

TABLE 5

Volume Size Distribution

| μm | % Finer | % in |
|---|---|---|
| 0.45 | 0 | 0 |
| 0.55 | 0 | 0 |
| 0.65 | 0 | 0 |
| 0.75 | 0 | 0. |
| 0.90 | 0.02 | 0.16 |
| 1.10 | 0.18 | 0.27 |
| 1.30 | 0.67 | 0.49 |
| 1.55 | 1.85 | 1.18 |
| 1.85 | 4.04 | 2.19 |
| 2.15 | 6.59 | 2.55 |
| 2.50 | 9.44 | 2.85 |
| 3.00 | 13.38 | 3.94 |
| 3.75 | 19.32 | 5.94 |
| 4.50 | 27.55 | 8.23 |
| 5.25 | 37.55 | 10.00 |
| 6.25 | 51.97 | 14.42 |
| 7.50 | 68.96 | 16.99 |
| 9.00 | 84.18 | 15.22 |
| 10.50 | 92.37 | 8.19 |
| 12.50 | 97.04 | 4.67 |
| 15.00 | 99.15 | 2.11 |
| 18.00 | 100 | 0.85 |
| 21.50 | 100 | 0 |
| 25.50 | 100 | 0 |
| 30.50 | 100 | 0 |
| 36.50 | 100 | 0 |
| 43.50 | 100 | 0 |
| 51.50 | 100 | 0 |
| 61.50 | 100 | 0 |
| 73.50 | 100 | 0 |
| 87.50 | 100 | 0 |

TABLE 6

| | |
|---|---|
| $X_{10}$ | 2.57 μm |
| $X_{25}$ | 4.27 μm |
| $X_{50}$ | 6.11 μm |
| $X_{75}$ | 8.10 μm |
| $X_{90}$ | 10.07 μm |
| $X_{95}$ | 11.63 μm |
| $S_v$ | 1.24 m²/cm³ |
| $S_m$ | 4.17E+03 cm²/g |
| Vol. Mean | 6.33 μm |
| 635 Mesh | 96.63% |
| 500 mesh | 98.87% |
| 450 mesh | 99.87% |
| 325 mesh | 100% |
| Density | 2.98 g/cm³ |

Figure 10:
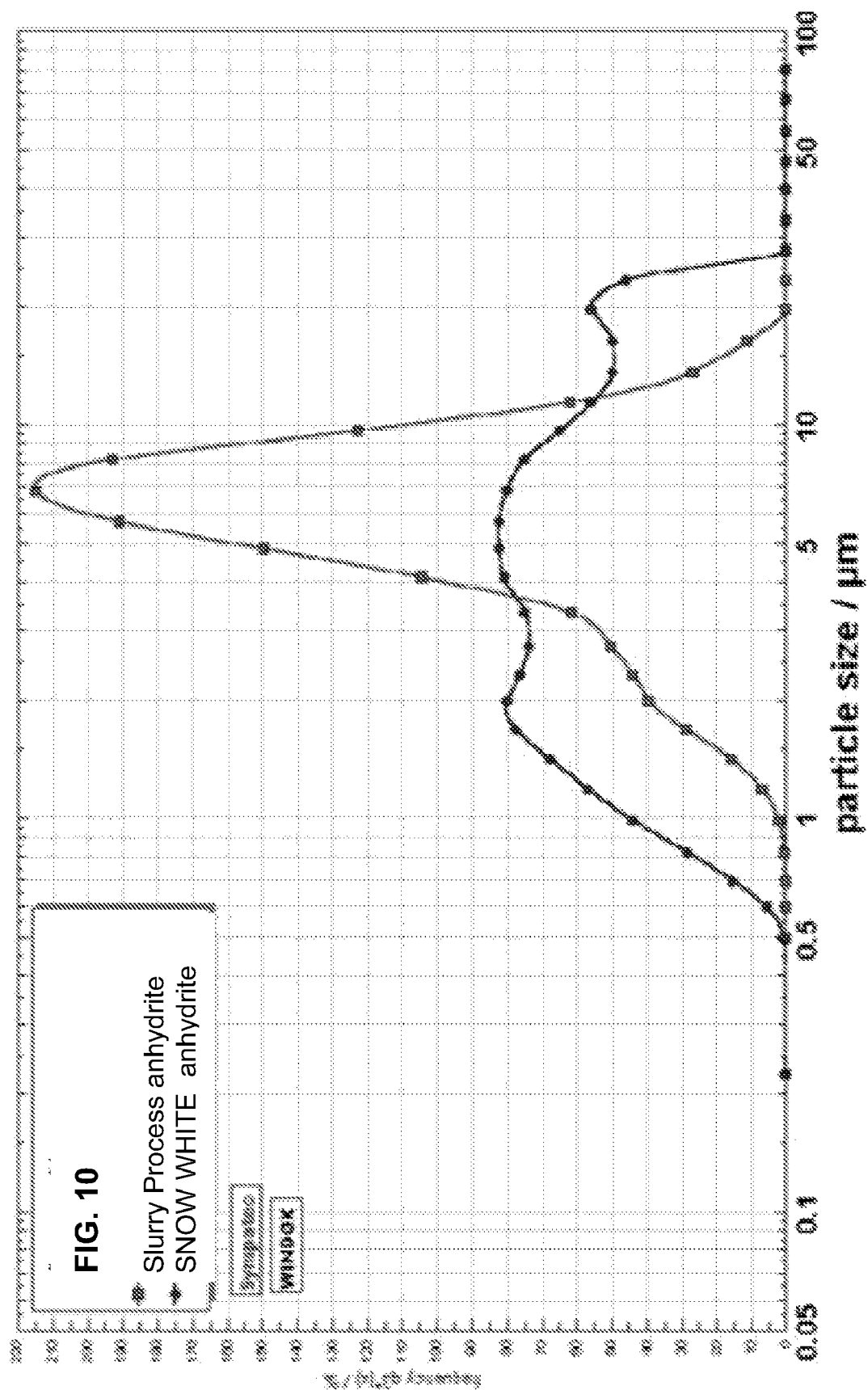
FIG. 10 shows particle size histograms comparing the anhydrite calcium sulfate product of the present slurry process with the SNOW WHITE anhydrite calcium sulfate product of the Multi Kettle Deadburn (MKD) process. The product of the present slurry process in this example is a 20-6 anhydrite, namely a product having a 20 micron top size and a 6 micron average particle size.

FIG. 10 shows particle size histograms comparing the anhydrite calcium sulfate product of the present slurry process with the SNOW WHITE anhydrite calcium sulfate product of the Multi Kettle Deadburn (MKD) process. The product of the present slurry process in this example is a 20-6 anhydrite, namely a product having a 20 micron top size and a 6 micron average particle size.

Figure 11:
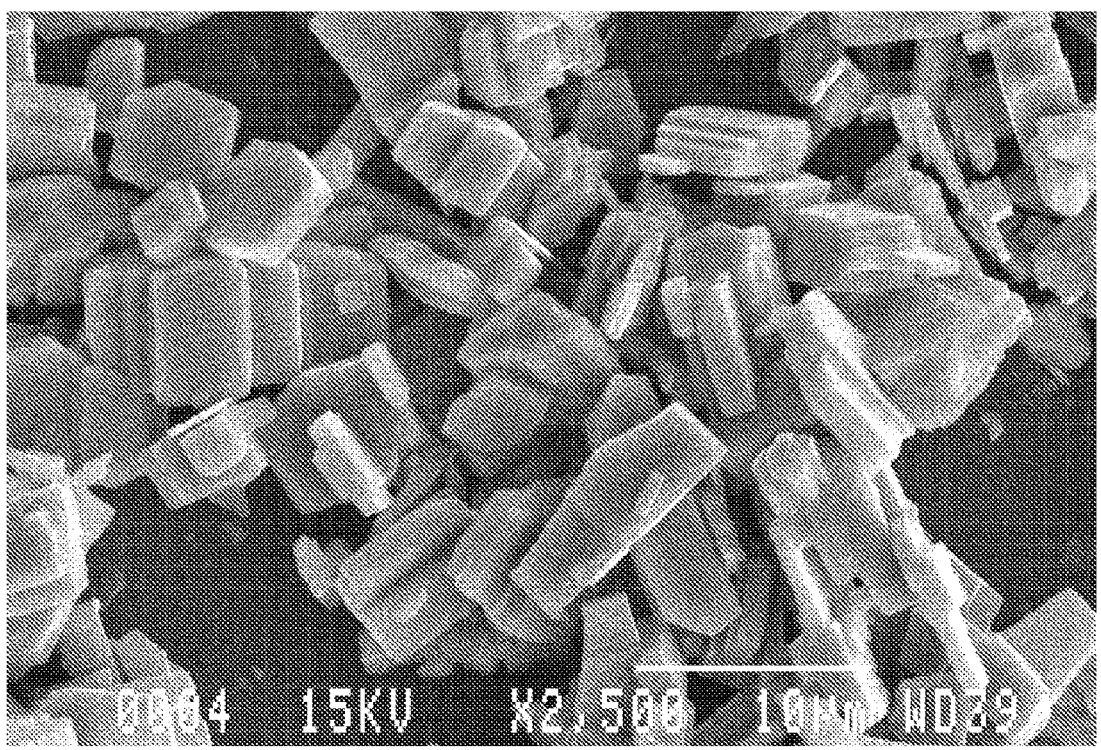
FIG. 11 is a photograph showing crystal morphology of the product of Example 3.

FIG. 11 is a photograph showing crystal morphology of the product of Example 3.

Example 4

In Example 4 the procedure of Example 1 was substantially repeated to make calcium sulfate anhydrite, but to study the possibility for preparing extra fine particles the slurry process of the present invention was modified to include a wet bead milling step. The slurry reactor was transformed into a wet bead mill by retrofitting the agitation rod of the 2 liter Parr reactor with stir bars instead of the normal impeller and loading the reactor vessel with 0.8 mm zirconium silicate grinding beads. The highest pressure achieved, residence time and solids percent were changed as listed in TABLE 1.

The resulting product had the following properties: 1.26μ average particle size; 5.25μ top particle size; 0.209 wt. % free moisture and 0.47 wt. % bound moisture as listed in TABLE 1. A significant factor in the moisture was its stability. After 13 days in a 90/90 room, the material did not pick up any moisture. Thus, the product is a stable anhydrite.

Figure 12:
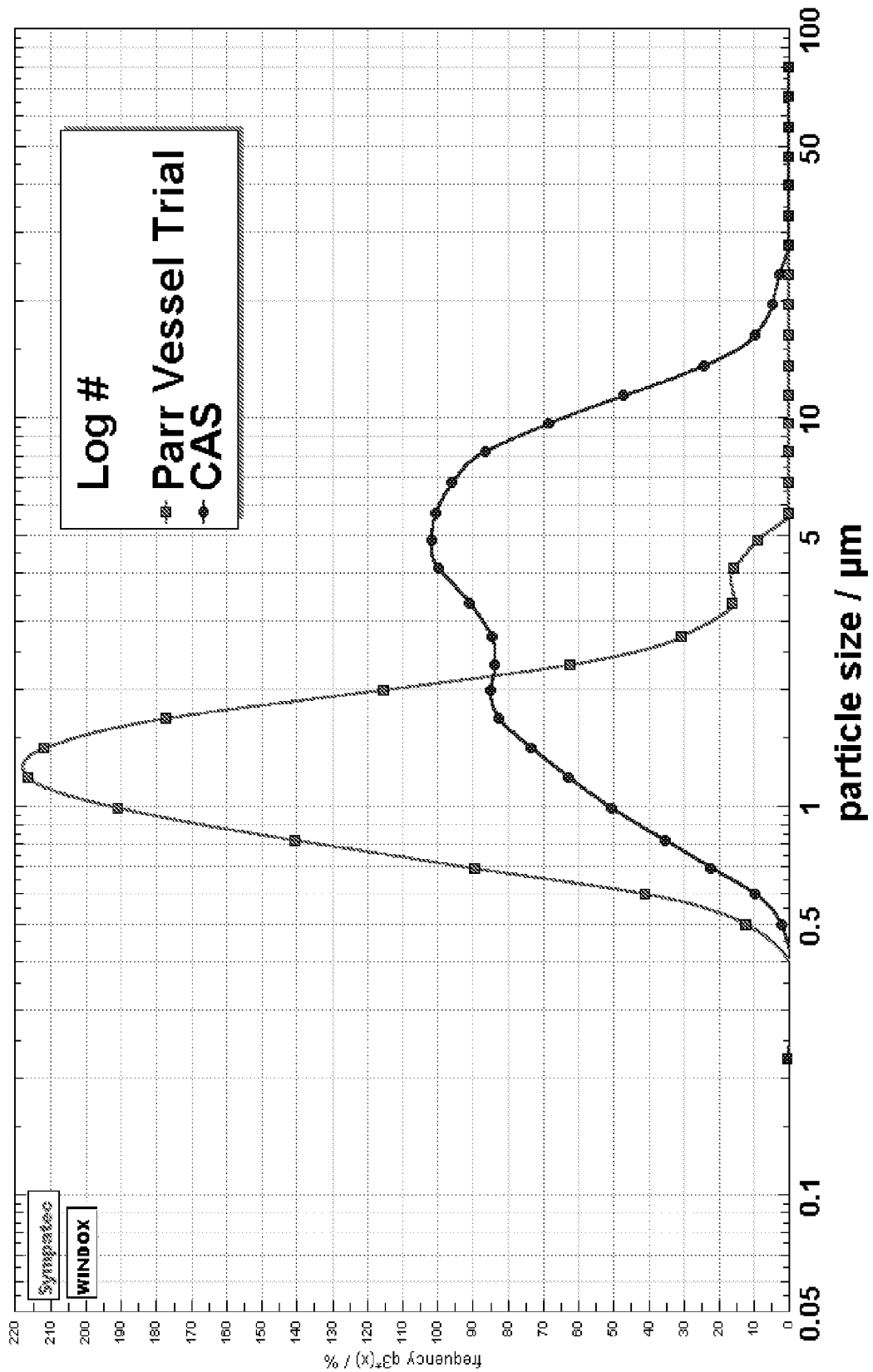
FIG. 12 is a plot (histogram) comparing particle size of the product of Example 4 and CAS 20-4.
Figure 13:
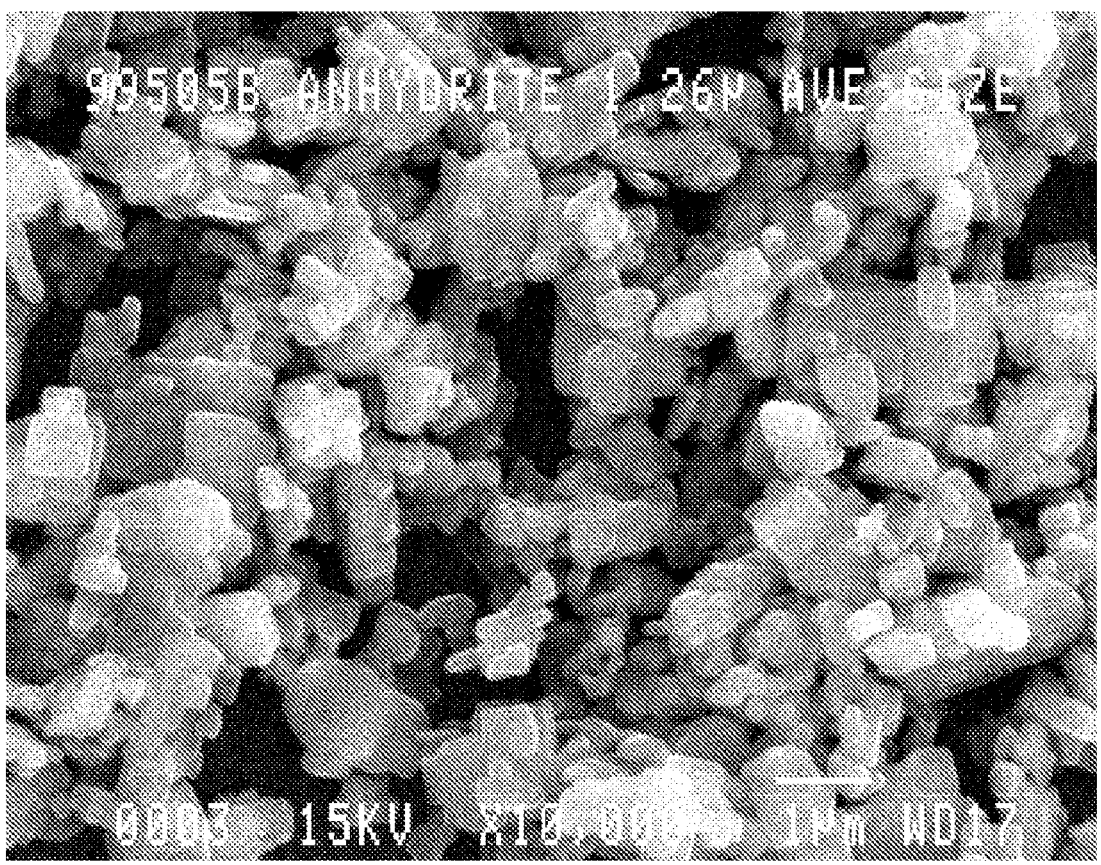
FIG. 13 is a photograph showing crystal morphology of the 1.26μ average particle size product of Example 4.

FIG. 12 is a plot (histogram) comparing particle size of the product of this example and CAS 20-4. FIG. 13 is a photograph showing crystal morphology of the 1.26μ average particle size product.

Example 5

In Example 5 the procedure of Example 4 was substantially repeated to make calcium sulfate anhydrite. Again to study the possibility for preparing extra fine particles the slurry process of the present invention was modified to include a wet bead milling step. The slurry reactor was transformed into a wet bead mill by retrofitting the agitation rod of the 2 liter Parr reactor with stir bars instead of the normal impeller and loading the reactor vessel with 0.8 mm zirconium silicate grinding beads. The highest pressure achieved, residence time and solids percent were changed as listed in TABLE 1.

The resulting product had the following properties: 1.4μ average particle size; 5.25μ top particle size; 0.119 wt. % free moisture and 0.524 wt. % bound moisture as listed in TABLE 1.

Example 6

Parameter studies were conducted to evaluate the variables of (a) bead:slurry volume ratio; (b) temperature and pressure; and residence time in the bead mixer. Various combinations of slurries and beads were fed to the reactor vessel of Example 4 and the reactor vessel was operated at a variety of conditions.

TABLE 7 lists data showing from experiments which varied the bead:slurry volume ratio. For these experiments, slurry volume was held constant at 435 ml and bead volume was changed.

TABLE 7

| | Bead:Slurry Volume Ratio | | | | | |
|---|---|---|---|---|---|---|
| | 0.46:1 | 0.63:1 | 0.8:1 | 0.92:1 | 1.09:1 | 1.72:1 |
| Average Particle Size (μ) | 1.64 | 1.55 | 1.4 | 1.35 | 1.42 | 2.25 |

TABLE 8 lists data showing that as the temperature and pressure were increased both the free and combined moisture were reduced.

TABLE 8

| | 565° F., 1050 psig | 590° F., 1300 psig | 600° F., 1450 psig |
|---|---|---|---|
| % free moisture (45° C.) | 0.256 | 0.223 | 0.209 |
| % combined moisture (240° C.) | 0.646 | 0.535 | 0.47 |

Example 7

Anhydrite that was already produced by the high temperature slurry bead milling process embodiment of the present invention was fed to the bead mill reactor and heated to a temperature of 600° C. and a pressure of 1420 psig and an impeller RPM of 900. The resulting product had a top size of 2.5 microns. The average particle size was 1.19 microns. The product had a stable bound moisture content of 0.47%.

Figure 14:
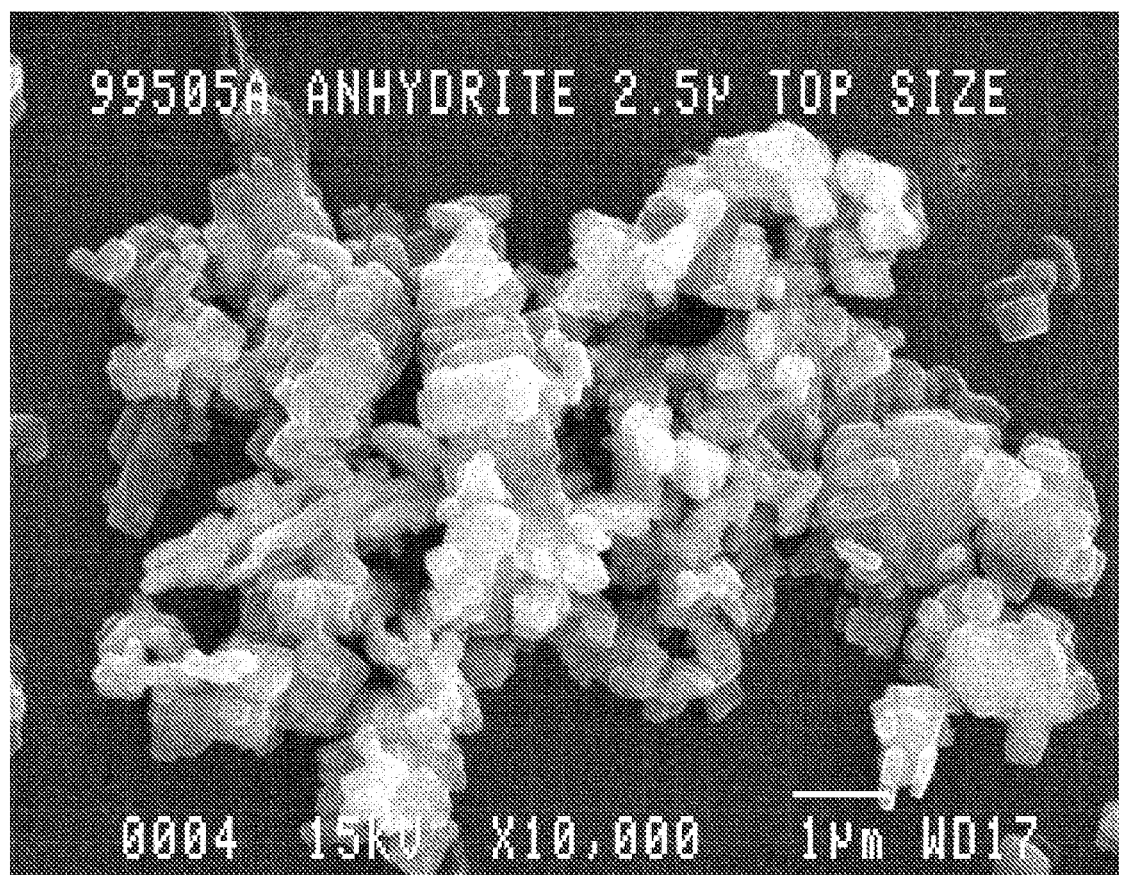
FIG. 14 shows a SEM photomicrograph of the product of Example 7.

FIG. 14 shows a SEM photomicrograph of the product of this example.

Although we have described the preferred embodiments for implementing the present invention, it will be understood by those skilled in the art to whom this disclosure is directed that modifications and additions may be made to our invention without departing from the spirit and scope thereof.

We claim:

1. A process for manufacturing calcium sulfate anhydrite comprising the steps of:
   feeding a 10-70 wt. % gypsum feed slurry to a reactor system, the feed slurry comprising particles comprising calcium sulfate dihydrate and water;
   calcining the feed slurry in the reactor system, while at least 95% of the water of the slurry remains liquid, at conditions sufficient to form a calcined slurry, wherein the slurry is wet ground in the reactor system at a temperature above 400° F. and a pressure above 250 psia prior to cooling the slurry from its temperature in the reactor to below 400° F., and wherein the slurry is held in the reactor system at conditions for calcining the calcium sulfate dihydrate to convert 95 to 100% of the calcium sulfate dihydrate to calcium sulfate anhydrite.

2. The process of claim 1, wherein the feed slurry comprises 20-70 wt. % calcium sulfate dihydrate.

3. The process of claim 1, wherein the calcining step comprises maintaining the slurry in the reactor at conditions for calcining the calcium sulfate dihydrate to convert 95 to 100% of the calcium sulfate dihydrate to insoluble calcium sulfate anhydrite.

4. The process of claim 3, wherein the insoluble calcium sulfate anhydrite of the calcined slurry is separated from the free water of the calcined slurry to recover at least 95% of the calcium sulfate anhydrite.

5. A process for manufacturing calcium sulfate anhydrite comprising the steps of:
   feeding a 10-70 wt. % gypsum feed slurry to a reactor system, the feed slurry comprising particles comprising calcium sulfate dihydrate and water;
   calcining the feed slurry in the reactor system, while at least 95% of the water of the slurry remains liquid, at conditions sufficient to form a calcined slurry, wherein the slurry is held in the reactor system at conditions for calcining the calcium sulfate dihydrate to convert 95 to 100% of the calcium sulfate dihydrate to calcium sulfate anhydrite,
   wherein the calcining step comprises maintaining the slurry in the reactor system at an anhydrite forming temperature of about 500 to 700° F. for a residence time of the slurry in the reactor system at the anhydrite forming temperature of from about 10 seconds to 2 hours.

6. The process of claim 5, wherein the calcining step comprises maintaining the slurry in the reactor system at an anhydrite forming temperature of about 550 to 650 F. for a residence time of the slurry in the reactor system at the anhydrite forming temperature of from about 10 seconds to about 15 minutes.

7. The process of claim 5, wherein the calcining step comprises maintaining the slurry in the reactor at an anhydrite forming temperature of about 550 to 600 F. for a residence time of the slurry in the reactor system at the anhydrite forming temperature of from about 10 seconds to about 15 minutes.

8. The process of claim 1, wherein the calcining is performed in a pipe reactor and the feed slurry is fed to an upstream end of the pipe reactor and the calcined slurry discharges from a downstream end of the pipe reactor.

9. The process of claim 8, wherein the feed slurry is fed to an upstream end of the pipe reactor and the calcined slurry discharges from a downstream end of the pipe reactor and a portion of the calcined slurry is pushed out of the reactor by a plunger.

10. The process of claim 8, wherein the feed slurry is fed to an upstream end of the pipe reactor, the slurry is then wet ground, and the wet ground slurry is discharged from a downstream end of the pipe reactor.

11. The process of claim 10, wherein the wet grinding occurs in a bead mill.

12. The process of claim 1, wherein feed slurry has greater than 55 to 70% solids and the calcined slurry feeds a receiving vessel to flash off water from the calcined slurry.

13. The process of claim 1, wherein feed slurry has greater than 55 to 70% solids and the calcined slurry feeds a cyclone to flash off water from the calcined slurry.

14. The process of claim 1, wherein the calcining is performed in an autoclave.

15. The process of claim 14, wherein the slurry is wet ground while in the autoclave.

16. The process of claim 15, wherein the wet grinding occurs in a bead mill.

* * * * *